US009236805B2

(12) United States Patent
Choi et al.

(10) Patent No.: US 9,236,805 B2
(45) Date of Patent: Jan. 12, 2016

(54) SYSTEM AND METHOD FOR CONTROLLING DC-DC CONVERTER

(71) Applicant: Hyundai Motor Company, Seoul (KR)

(72) Inventors: Won Kyoung Choi, Hwaseong-si (KR); Hui Sung Jang, Hwaseong-si (KR); Sung Kyu Kim, Bucheon-si (KR); Mu Shin Kwak, Osan-si (KR); Hyun Wook Seong, Seoul (KR); Su Hyun Bae, Daegu (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 200 days.

(21) Appl. No.: 14/023,000

(22) Filed: Sep. 10, 2013

(65) Prior Publication Data

US 2014/0369075 A1 Dec. 18, 2014

(30) Foreign Application Priority Data

Jun. 13, 2013 (KR) ........................ 10-2013-0067693

(51) Int. Cl.
*H02M 3/335* (2006.01)
*H02M 1/32* (2007.01)
*H02M 3/337* (2006.01)

(52) U.S. Cl.
CPC ............ *H02M 3/33515* (2013.01); *H02M 1/32* (2013.01); *H02M 3/3376* (2013.01)

(58) Field of Classification Search
CPC . H02M 3/28; H02M 3/33569; H02M 3/3376; H02M 3/33507; H02M 7/537
USPC ............................ 363/15, 16, 17, 95, 97, 131
See application file for complete search history.

(56) References Cited

U.S. PATENT DOCUMENTS

| | | | | |
|---|---|---|---|---|
| 4,823,251 A | * | 4/1989 | Kawabata et al. | ............... 363/95 |
| 5,257,180 A | * | 10/1993 | Sashida et al. | .................. 363/71 |
| 5,986,895 A | * | 11/1999 | Stewart et al. | .................. 363/16 |
| 6,507,507 B2 | * | 1/2003 | Tokunaga et al. | ............... 363/89 |
| 2005/0248964 A1 | * | 11/2005 | Dalal | ......................... 363/21.08 |
| 2007/0164720 A1 | * | 7/2007 | Lalithambika et al. | ........ 323/288 |
| 2008/0150508 A1 | * | 6/2008 | Sohma | .......................... 323/283 |
| 2008/0203994 A1 | * | 8/2008 | Park | .............................. 323/318 |
| 2008/0212345 A1 | * | 9/2008 | Yamashita et al. | ............... 363/50 |

FOREIGN PATENT DOCUMENTS

| | | |
|---|---|---|
| JP | 09-73328 A | 3/1997 |
| JP | 2006-101636 A | 4/2006 |
| KR | 10-2004-0077726 A | 9/2004 |
| KR | 10-0597025 B1 | 7/2006 |
| KR | 10-2010-0031964 A | 3/2010 |

\* cited by examiner

*Primary Examiner* — Adolf Berhane
(74) *Attorney, Agent, or Firm* — McDermot Will & Emery LLP

(57) ABSTRACT

A system and a method for controlling a DC-DC converter include a microcomputer for deriving an input limiting current value by dividing an input limiting power value by an input voltage value. A conversion circuit scales the input limiting current value to a limiting voltage value. A voltage control circuit derives a control voltage value based on an output voltage value and a reference voltage value and defines the limiting voltage value as a control voltage limiting value. A current control circuit generates a pulse width modulation (PWM) control signal based on the control voltage value.

6 Claims, 3 Drawing Sheets

SYSTEM AND METHOD FOR CONTROLLING DC-DC CONVERTER

CROSS REFERENCE TO RELATED APPLICATION

This application claims under 35 U.S.C. §119(a) the benefit of Korean Patent Application No. 10-2013-0067693 filed on Jun. 13, 2013, the entire contents of which are incorporated herein by reference.

TECHNICAL FIELD

The present disclosure relates to a system and method for controlling a direct current, DC-DC converter, which limit the maximum output therefrom or the maximum input therefore used in an environment-friendly vehicle.

BACKGROUND

In the past, an output current limiting method has been used to limit the maximum output of a DC-DC converter. This method limits the maximum output voltage depending on an output current using a microcomputer, defined as Vout_ref=Pout_limit/Iout.

The above mentioned method enables easy implementation in which a microcomputer generates a voltage command. However, the above described method requires an output current sensor or calculation of an output current from an input current, therefore limiting performance, such as slow responsiveness.

The output limiting method using an input current limits the maximum input since the maximum input is limited, and output is limited in proportion to the limited input.

With a relatively well-designed controller, the output value of a voltage controller is identical to its input current. Therefore, the controller limits the maximum input current by controlling the input current, thus limiting the maximum input (power).

By using an internal state system of the controller, high-speed performance is proportional to control performance. Further, by controlling current, the system removes a separate sensor and implements digital control. However, in the case of analog control, a circuit for limiting a current command in response to an input voltage and a scheme for limiting a current to the maximum current regardless of an input voltage are required.

The foregoing is intended merely to aid in the better understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the prior art, and the present disclosure provides a system and a method for controlling a direct current, DC-DC converter, which limit the maximum output or the maximum input of the DC-DC converter used in an environment-friendly vehicle.

According to an aspect of the present disclosure, a system for controlling a direct current, DC-DC converter includes a microcomputer for deriving an input limiting current value by dividing an input limiting power value by an input voltage value. A conversion circuit scales the input limiting current value to a limiting voltage value, and a voltage control circuit derives a control voltage value based on an output voltage value and a reference voltage value and defines the limiting voltage value as a control voltage limiting value. A current control circuit generates a pulse width modulation (PWM) control signal based on the control voltage value.

The conversion circuit may have a predetermined voltage range and derive the limiting voltage value by scaling the input limiting current value within the predetermined voltage range.

The current control circuit may generate the PWM control signal to control a bridge converter, thus controlling an input current.

According to another aspect of the present disclosure, a system for controlling a DC-DC converter includes a microcomputer for deriving an output limiting current value by dividing an output limiting power value by an output voltage value. A conversion circuit scales the output limiting current value to a limiting voltage value, and a voltage control circuit derives a control voltage value based on an output voltage value and a reference voltage value and defines the limiting voltage value as a control voltage limiting value. A current control circuit generates a pulse width modulation (PWM) control signal based on the control voltage value.

According to an embodiment of the present disclosure, a method of controlling a DC-DC converter includes: deriving an input limiting current value by dividing an input limiting power value by an input voltage value; scaling the input limiting current value to a limiting voltage value; deriving a control voltage value based on a reference voltage value and a feedback output voltage value and defining the limiting voltage value as a control voltage limiting value; and generating a pulse width modulation (PWM) control signal for a bridge converter based on the control voltage value.

According to another embodiment of the present disclosure, a method of controlling a DC-DC converter includes: deriving an output limiting current value by dividing an output limiting power value by an output voltage value; scaling the output limiting current value to a limiting voltage value; deriving a control voltage value based on a reference voltage value and a feedback output voltage value and setting the limiting voltage value as a control voltage limiting value; and generating a PWM control signal for a bridge converter based on the control voltage value.

The system and method for controlling the DC-DC converter as described above has advantages of using a current controller sensor and a current command, thus removing a separate sensor and providing high-performance responsiveness at the same level as that of current control performance respectively.

BRIEF DESCRIPTION OF THE DRAWINGS

The above and other objects, features and advantages of the present disclosure will be more clearly understood from the following detailed description taken in conjunction with the accompanying drawings.

DETAILED DESCRIPTION

Hereinafter, embodiments of a system and a method for controlling a DC-DC converter according to the present disclosure will be described in detail with reference to the attached drawings.

Figure 1:
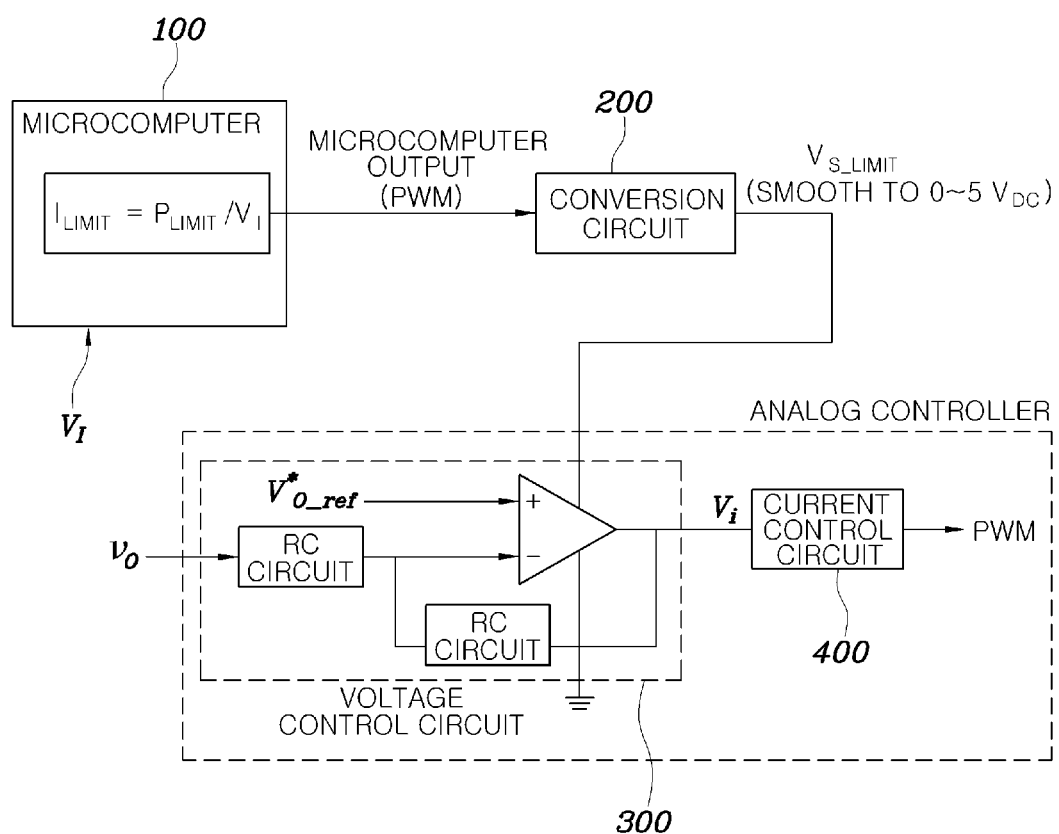
FIG. 1 is a diagram showing a system for controlling a DC-DC converter according to an embodiment of the present disclosure.
Figure 2:
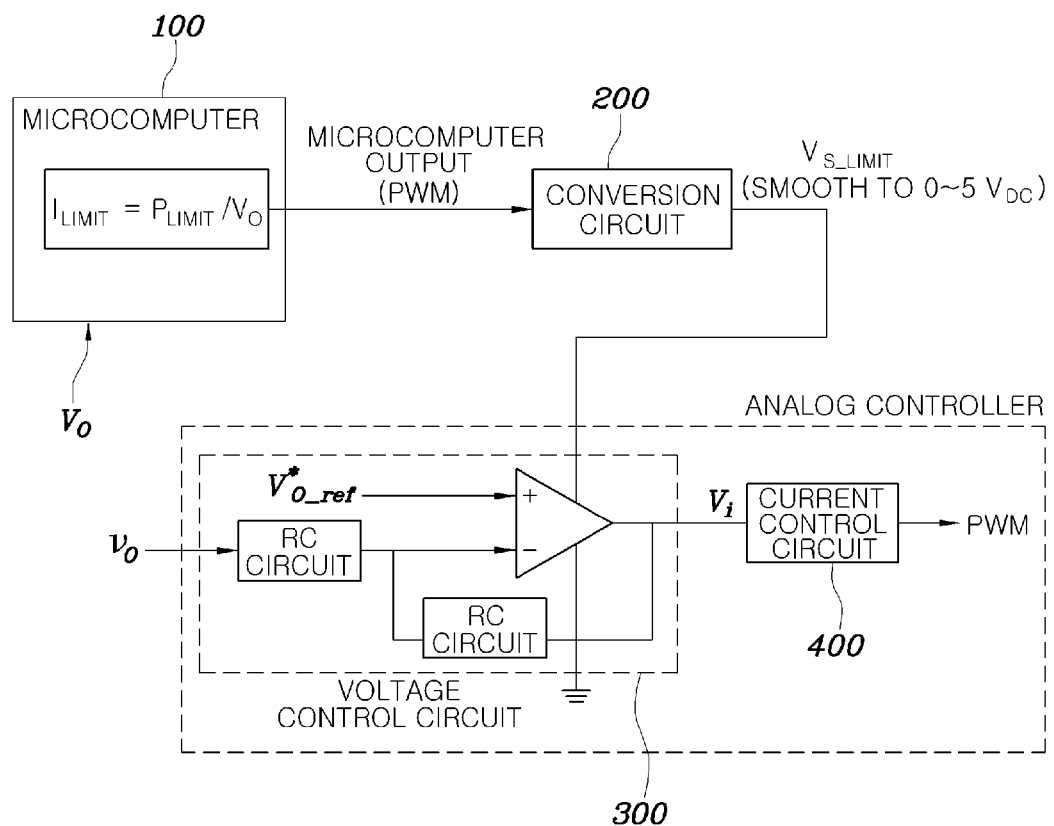
FIG. 2 is a diagram showing a system for controlling a DC-DC converter according to another embodiment of the present disclosure.

FIG. 1 is a diagram showing a system for controlling a DC-DC converter according to an embodiment of the present disclosure, and FIG. 2 is a diagram showing a system for controlling a DC-DC converter according to another embodiment of the present disclosure.

The DC-DC converter control system according to the present disclosure includes a microcomputer 100 for deriving an input limiting current value by dividing an input limiting power value by an input voltage value. A conversion circuit 200 scales the input limiting current value to a limiting voltage value, and a voltage control circuit 300 derives a control voltage value based on an output voltage value and a reference voltage value and defines the limiting voltage value as the control voltage limiting value. A current control circuit 400 generates a pulse width modulation (PWM) control signal based on the control voltage value.

The present disclosure presents a method of applying digital control to an analog scheme. The circuit of the present disclosure is a circuit limiting the maximum input using the microcomputer ($I_{LIMIT}=P_{LIMIT}/V_I$ or $V_O$), and a voltage varying at a pin for supplying power to the error amplifier (Operational Amplifier: OP Amp) of the voltage control circuit. The method limits the output of the Amp to a power supply voltage, therefore, the maximum voltage of the Amp based on the output of the microcomputer and the maximum current of the current control circuit are limited.

Figure 3:
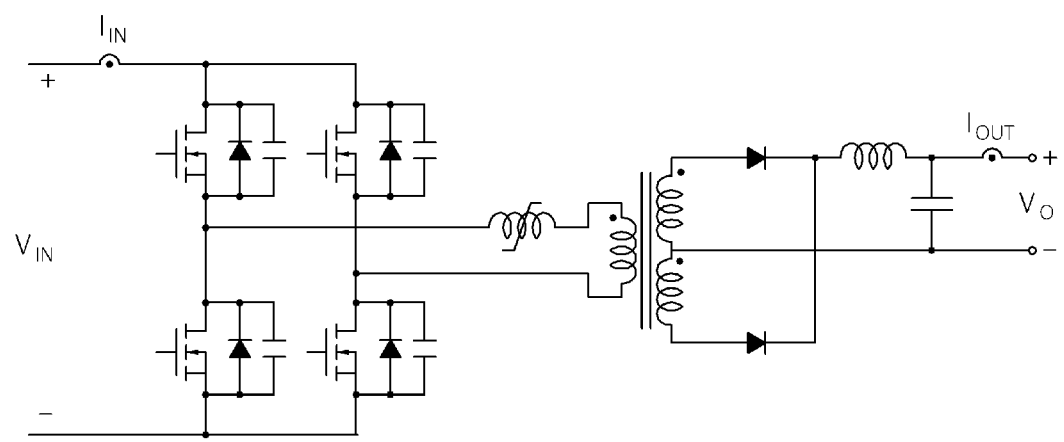
FIG. 3 is a diagram showing a DC-DC converter.

The DC-DC converter protects the circuit by limiting input power or output power. The input current value is controlled within the limit thereof since the DC-DC converter generally limits output power by controlling an input current. FIG. 3 illustrates the DC-DC converter, wherein input power $V_{IN}*I_{IN}$ or output power $V_O*I_{OUT}$ is limited so as to define the maximum limit.

FIG. 1 is a diagram showing the system for controlling the DC-DC converter according to the embodiment of the present disclosure, wherein a power limit is calculated. In order to limit the input power, the microcomputer receives an input voltage value $V_I$ through a sensor, divides an input limiting power value by the input voltage value, and then derives an input limiting current value ($I_{LIMIT}=P_{LIMIT}/V_I$).

The conversion circuit scales the derived input limiting current value $I_{LIMIT}$ to a limiting voltage value $V_{S\_LIMIT}$. Further, the conversion circuit defines the scaled limiting voltage value as a control voltage limiting value $V_i$ to control the current control circuit, thus limiting the input current not to exceed a required maximum value.

The voltage control circuit generates a voltage command to control the current control circuit for controlling an input current by switching the bridge converter and derives the control voltage value $V_i$ based on an output voltage value $V_O$ and a reference voltage value, $V*_{O\_ref}$. Further, the limiting voltage value $V_{S\_LIMIT}$ is used as the control voltage limiting value.

The current control circuit generates a pulse width modulation (PWM) control signal to control the bridge converter in response to the derived control voltage value and controls the input current to a desired value using the PWM control signal, thus defining the input current limit and protecting the circuit.

The conversion circuit may have a predetermined voltage range and may scale the input limiting current value within the voltage range, thus deriving the limiting voltage value. Referring to FIG. 1, the input limiting current value is scaled within a voltage range of 0 to 5 V, and then the limiting voltage value is derived. The current control circuit controls the bridge converter by generating the PWM control signal, thus controlling the input current.

A method of controlling the DC-DC converter according to the present disclosure includes the first step of deriving an input limiting current value by dividing an input limiting power value by an input voltage value. The second step scales the input limiting current value to a limiting voltage value. The third step derives a control voltage value based on a reference voltage value and a feedback output voltage value and defines the limiting voltage value as the control voltage limiting value. The fourth step generates a PWM control signal for the bridge converter based on the control voltage value.

As described above, the microcomputer may derive the input limiting current value by dividing the input limiting power value by the input voltage value. The conversion circuit may scale the input limiting current value to the limiting voltage value. The voltage control circuit may derive the control voltage value based on the reference voltage value and the feedback output voltage value and define the limiting voltage value as the control voltage limiting value. The current control circuit may generate a PWM control signal for a bridge converter based on the control voltage value.

FIG. 2 is a diagram showing a system for controlling a DC-DC converter according to another embodiment of the present disclosure. The DC-DC converter control system according to another embodiment of the present disclosure includes a microcomputer 100 for deriving an output limiting current value by dividing an output limiting power value by an output voltage value. A conversion circuit 200 scales the output limiting current value to a limiting voltage value, and a voltage control circuit 300 derives a control voltage value based on an output voltage value and a reference voltage value and defines the limiting voltage value as the control voltage limiting value. A current control circuit 400 generates a pulse width modulation (PWM) control signal based on the control voltage value in the case where the microcomputer derives the output limiting current value by dividing the output limiting power value by the output voltage value. In order to limit output power, an output voltage $V_O$ is input through a sensor, and limiting the output current ($I_{LIMIT}=P_{LIMIT}/V_O$). $I_{LIMIT}$ denotes the output limiting current value, and $P_{LIMIT}$ denotes the output limiting power value. Here, the converter limit is defined based on an output stage.

The conversion circuit scales the derived output limiting current value $I_{LIMIT}$ to a limiting voltage value $V_{S\_LIMIT}$. Then, the conversion circuit defines the scaled limiting voltage value as a control voltage limiting value $V_i$ to control the current control circuit, thus limiting the controlled input current not to exceed a required maximum value.

In detail, the voltage control circuit generates a voltage command to control the current control circuit for controlling the input current by switching the bridge converter and derives the control voltage value $V_i$ based on the output voltage value $V_O$ and a reference voltage value $V*_{O\_ref}$. Further, for the control voltage limiting value, the defined limiting voltage value $V_{S\_LIMIT}$ by the voltage control circuit 300 is used.

The current control circuit generates a PWM control signal to control the bridge converter in response to the derived control voltage value and controls the input current to a desired value using the PWM control signal, thus defining the input current limit and protecting the circuit.

Here, the conversion circuit may have a predetermined voltage range and may scale the output limiting current value within the voltage range, thus deriving the limiting voltage value. That is, the output limiting current value is scaled within a voltage range of 0 to 5 V, and then the limiting voltage value is derived. Further, the current control circuit generates the PWM control signal to control the bridge converter, thus controlling the input current.

A method of controlling the DC-DC converter according to another embodiment of the present disclosure includes the first step of deriving an output limiting current value by dividing an output limiting power value by an output voltage value. The second step scales the output limiting current value to a limiting voltage value, and the third step derives a control voltage value based on a reference voltage value and a fed-back output voltage value and sets the limiting voltage value as the control voltage limiting value. The fourth step generates a PWM control signal for the bridge converter based on the control voltage value.

The system and method for controlling the DC-DC converter according to the present disclosure has advantages of using the sensor of a current controller and a current comment, thus removing a separate exclusive sensor and providing high-performance responsiveness at the same level as that of current control performance respectively.

Although the embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A system for controlling a direct current, DC-DC converter, comprising:
   a microcomputer for deriving an input limiting current value by dividing an input limiting power value by an input voltage value;
   a conversion circuit for scaling the input limiting current value to a limiting voltage value;
   a voltage control circuit for deriving a control voltage value based on an output voltage value and a reference voltage value and defining the limiting voltage value as a control voltage limiting value; and
   a current control circuit for generating a pulse width modulation (PWM) control signal based on the control voltage value.

2. The system of claim 1, wherein the conversion circuit has a predetermined voltage range and derives the limiting voltage value by scaling the input limiting current value within the voltage range.

3. The system of claim 1, wherein the current control circuit controls a bridge converter by generating the PWM control signal, thus controlling an input current.

4. A system for controlling a DC-DC converter, comprising:
   a microcomputer for deriving an output limiting current value by dividing an output limiting power value by an output voltage value;
   a conversion circuit for scaling the output limiting current value to a limiting voltage value;
   a voltage control circuit for deriving a control voltage value based on an output voltage value and a reference voltage value and defining the limiting voltage value as a control voltage limiting value; and
   a current control circuit for generating a pulse width modulation (PWM) control signal based on the control voltage value.

5. A system for controlling a DC-DC converter, comprising:
   a microcomputer for deriving an input limiting current value by dividing an input limiting power value by an input voltage value;
   a conversion circuit for scaling the input limiting current value to a limiting voltage value;
   a voltage control circuit for deriving a control voltage value based on an output voltage value and a reference voltage value and defining the limiting voltage value as a control voltage limiting value; and
   a current control circuit for generating a pulse width modulation (PWM) control signal based on the control voltage value,
   wherein the voltage control circuit comprises an error amplifier, the output voltage value and the reference voltage value are input to the error amplifier, the error amplifier outputs the control voltage value, and the limiting voltage value is supplied as power of the error amplifier.

6. A system for controlling a DC-DC converter, comprising:
   a microcomputer for deriving an output limiting current value by dividing an output limiting power value by an output voltage value;
   a conversion circuit for scaling the output limiting current value to a limiting voltage value;
   a voltage control circuit for deriving a control voltage value based on an output voltage value and a reference voltage value and defining the limiting voltage value as a control voltage limiting value; and
   a current control circuit for generating a pulse width modulation (PWM) control signal based on the control voltage value,
   wherein the voltage control circuit comprises an error amplifier, the output voltage value and the reference voltage value are input to the error amplifier, the error amplifier outputs the control voltage value, and the limiting voltage value is supplied as power of the error amplifier.

* * * * *